June 24, 1969  E. J. DE HOFF  3,451,509

DISC BRAKE FLOATING CALIPER MOUNTING MEANS

Filed March 8, 1968

INVENTOR.
Edward J. De Hoff
BY
C. L. Engle
ATTORNEY

United States Patent Office 3,451,509
Patented June 24, 1969

3,451,509
DISC BRAKE FLOATING CALIPER
MOUNTING MEANS
Edward J. de Hoff, Dayton, Ohio, assignor to General Motors Corporation, Detroit, Mich., a corporation of Delaware
Filed Mar. 8, 1968, Ser. No. 711,807
Int. Cl. F16d 55/00, 65/14
U.S. Cl. 188—73          3 Claims

ABSTRACT OF THE DISCLOSURE

An arrangement for mounting a disc brake floating caliper in association with a non-rotatable splash shield. A wedge-shaped caliper housing is positioned in a sectorial recess in a splash shield and is biased into engagement therewith by two springs so that application of the brakes does not result in a clanking noise.

---

This invention relates to a mounting arrangement for a disc brake floating caliper and, more particularly, to a mounting preventing rapid engagement of the caliper with an associated stationary surface which would normally create objectionable noise.

Recently, the trend in the automotive industry is to more frequently use disc brake assemblies in association with front vehicle vehicle wheels to provide better braking characteristics and longer brake lining wear. These front disc brake assemblies are conventionally used in association with a stationary splash shield to prevent foreign matter from entering into the brake assembly and in such arrangements it often happens that engagement of the disc brake shoes with a rotating braking disc causes the caliper to partially rotate with the disc and rapidly engage the surface of the splash shield producing a loud clanking or rattling noise. It is, therefore, a purpose of this invention to eliminate this objectionable noise and consequent wear of the engaging surfaces by providing a mounting means which prevents such rapid engagement of the caliper with the associated fixed members.

Accordingly, among the objects of this invention is the provision of a mounting means which retains the floating brake caliper in a manner to prevent clanking or rattling noises during engagement of the brakes.

A further object of this invention is the provision of mating surfaces on a floating disc brake caliper and a fixed associated member which are biased into continual engagement by a resilient spring connection.

A still further object of this invention is the provision of spaced abutting surfaces on a floating disc brake caliper and a fixed member which engage when the brakes are applied, thereby removing a slope component force from the resilient spring connection.

Figure 1:
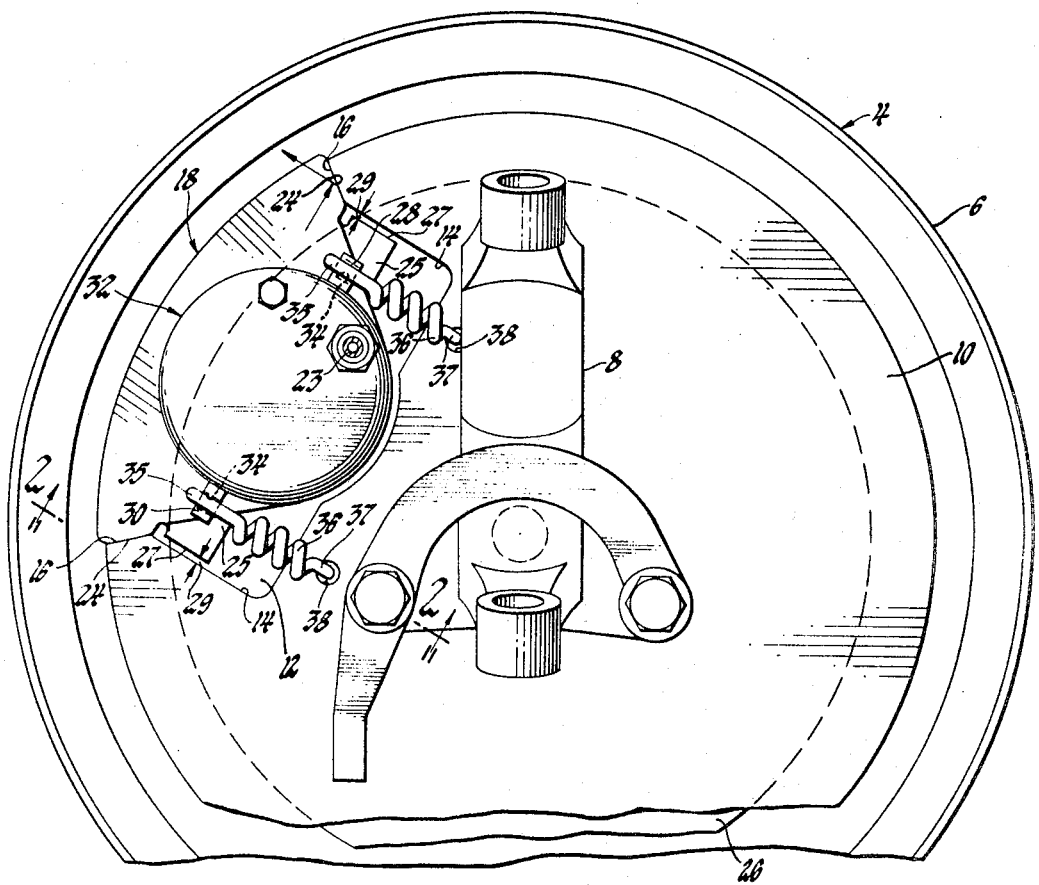

In the drawings:
FIGURE 1 is a fragmentary side elevational view illustrating a floating brake caliper secured to a fixed splash shield mounted on the steering knuckle of a front vehicle wheel.

Figure 2:
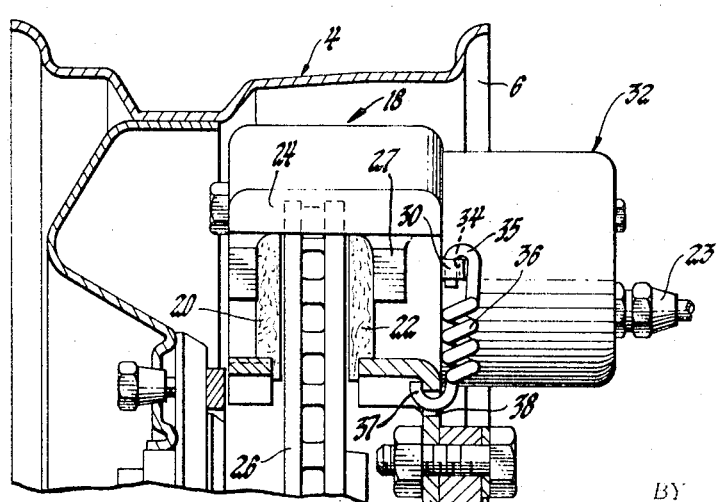

FIGURE 2 is a fragmentary view partly in section and partly in elevation taken on lines 2—2 of FIGURE 1.

With reference to FIGURE 1, a wheel assembly 4 is shown including a wheel 6 with a steering knuckle and bearing assembly 8 rotatably supporting the wheel. Splash shield 10 is non-rotatably mounted adjacent the steering knuckle 8 and contains a sector recess 12. The recess 12 includes side wall abutment surfaces 14 that terminate in circumferentially spaced inwardly converging angular surfaces 16. A floating disc brake caliper assembly 18 is disposed within the recess 12 and includes friction shoes 20 and 22, best shown in FIGURE 2. The disc brake caliper 18 also comprises opposed edge inwardly converging angular surfaces 24 which are configured to conform with corresponding surfaces 16 of the splash shield 10. Adjacent and radially inward of angular surfaces 24, caliper 18 has oppositely extending abutments 25 terminating in planar surfaces 27 which are parallel to the side walls 14. A small space 29 is provided between side walls 14 and surfaces 27 for a purpose later described. The wheel assembly 4 includes a rotating disc 26 which is located between the friction shoes 20 and 22. Flanges 28 and 30 are formed on the disc brake caliper cylinder portion 32 and contain apertures 34 each of which receives one end 35 of coil springs 36. The other end 37 of the coil springs 36 is received and retained in apertures 38 in a splash shield 10.

From the above description it is apparent that the coil springs 36 are placed in tension when connected to flanges 28 and 30 of the brake caliper and to the splash shield at apertures 34. The force of these springs tends to pull the caliper assembly radially inward toward the center of the splash shield and into wedging engagement therewith whereby the angular surfaces 24 of the caliper are in continual frictional engagement with splash shield angular surfaces 16.

When the brakes are applied, movement of a piston operating in cylindrical portion 32 in response to pressure fluid entering through fitting 23 engages friction shoes 20 and 22 with rotating disc 26 and the caliper assembly 18 tends to rotate with the disc 26. This tendency of caliper 18 to rotate produces a slope component force sufficient to slightly move the caliper radially outwardly with the surfaces 24 sliding upon surfaces 16 of the stationary splash shield. This movement, in opposition to the force of springs 36 and the surface frictional force, continues until one of the abutment surfaces 27 engages a side wall abutment 14 whereupon the springs 36 are relieved of the slope component force. It is apparent that due to the continual engagement between the caliper angular surfaces 24 and the splash shield angular surfaces 16, the caliper assembly 18 is restrained from rotation and quiet engagement of the brake assembly is accomplished.

It is necessary that the angle of the mating surfaces 16 and 24 with respect to a radial line through the center of the splash shield 10 be sufficient to provide a slope force component of greater magnitude than the combined forces of the springs 36 and the frictional force developed between the engaging surfaces. However, use of a large slope angle could provide an unnecessarily large slope component causing the floating caliper to strike the splash shield with a high energy impact force to create the undesirable noise. Therefore, design of a specific arrangement must necessarily include consideration of various factors such as specific caliper design, materials used in the engaging surfaces, surface finish, lubrication, and the thermal operating ranges encountered in order to determine a preferred slope for the angular surfaces for both the caliper and the splash shield.

In the usual disc brake mounting arrangement, no provision is made to continually urge the surface of the brake caliper into engagement with a fixed surface and in fact a space usually occurs between these members. In this type of arrangement, application of the brakes results in slight rotation of the floating disc brake caliper bringing it into rapid contact with a fixed surface to produce an undesirable sound. From the above description, it is evident that this invention has provided a simple and efficient means of eliminating this objectionable sound and that the above description is not intended to limit the scope of this invention.

I claim:
1. A disc brake floating caliper mounting arrangement comprising a non-rotatably mounted splash shield, a rotatable brake disc, a recess in said shield having spaced angular surfaces adjacent the periphery of said shield and abutment surfaces located radially inwardly thereof, a floating disc brake caliper mounted in said recess and having brake shoes movable into and out of engagement with said disc, angular caliper edge surfaces formed near the periphery of said caliper for mating engagement with said angular shield surfaces, abutment surfaces on said caliper separate and spaced from said edge surfaces and located radially inwardly of said edge surfaces, said abutment surfaces of said caliper and splash shield being normally spaced from each other, and resilient means connected between said caliper and said shield for maintaining said angular caliper surfaces in sliding wedging engagement with said angular shield surfaces, said caliper reacting upon engagement of the brake shoes with the brake disc to effect radial movement of said caliper along said angular surfaces until one of said caliper abutments engages one of said shield abutments whereby noiseless application of the brakes is achieved.

2. A disc brake floating caliper mounting arrangement as described in claim 1 wherein said resilient means comprises a pair of coil springs connected between said floating caliper and said splash shield.

3. A disc brake floating caliper mounting arrangement comprising a non-rotatably mounted splash shield, a rotatable brake disc, a sector recess in said splash shield having spaced angular surfaces adjacent the periphery of said shield and parallel abutment surfaces located inwardly of the angular surfaces on opposite side walls of said recess, a floating disc brake caliper mounted in and shaped to substantially conform with said recess having brake shoes movable into and out of engagement with said disc, angular edge surfaces on said caliper near its periphery for mating engagement with said angular shield surfaces, abutments located inwardly of said edge surfaces on said caliper separate and spaced from said edge surfaces and extending oppositely from said caliper and terminating in surfaces spaced from and parallel to said shield abutment surfaces, and resilient means connected between said caliper and said shield maintaining said angular caliper surfaces in wedging engagement with said angular shield surfaces, said caliper reacting upon engagement of the brake shoes with the brake disc to effect radial movement of said caliper along said angular surfaces until one of said caliper abutments engages one of said shield abutments whereby the brakes are quietly applied.

References Cited

UNITED STATES PATENTS 3,265,160   8/1966   Elberg et al. _____ 188—73
3,387,687   6/1968   Eggstein et al. _____ 188—73

GEORGE E. A. HALVOSA, *Primary Examiner.*

U.S. Cl. X.R.

188—205